United States Patent [19]
Eichinger

[11] 3,960,029

[45] June 1, 1976

[54] GEAR DRIVE

[75] Inventor: Johann Eichinger, Putzbrunn, Germany

[73] Assignee: Carl Hurth, Maschinen- und Zahnradfabrik, Munich, Germany

[22] Filed: Mar. 25, 1975

[21] Appl. No.: 561,671

[30] Foreign Application Priority Data
Apr. 2, 1974  Germany.......................... 7411435

[52] U.S. Cl.................................. 74/413; 74/468; 184/6.12
[51] Int. Cl.²..................... F16H 1/06; F16H 57/04; F01M 9/10
[58] Field of Search............ 74/413, 467, 468, 801, 74/750 R; 184/11 A, 11 B, 6.12

[56] References Cited
UNITED STATES PATENTS

| | | |
|---|---|---|
| 1,299,156 | 4/1919 | Fast .............................. 184/6.12 X |
| 1,773,288 | 8/1930 | Valletta ............................... 74/413 |
| 3,539,035 | 11/1970 | Wolkenstein ..................... 74/467 X |
| 3,834,248 | 9/1974 | Caliri ............................... 74/467 X |

*Primary Examiner*—Leonard H. Gerin
*Attorney, Agent, or Firm*—Woodhams, Blanchard and Flynn

[57] ABSTRACT

A gear drive arrangement having at least two meshing spur gears which are helical or straight toothed in only one direction. One of the meshing spur gears has at least two axially spaced gear parts thereon and, approximately in the center thereof, at least one peripheral groove separating the two gear parts. The depth of the groove is at least as great as the height of the tooth and preferably extends below the root circle. The other meshing spur gear is free of a peripheral groove thereon.

4 Claims, 1 Drawing Figure

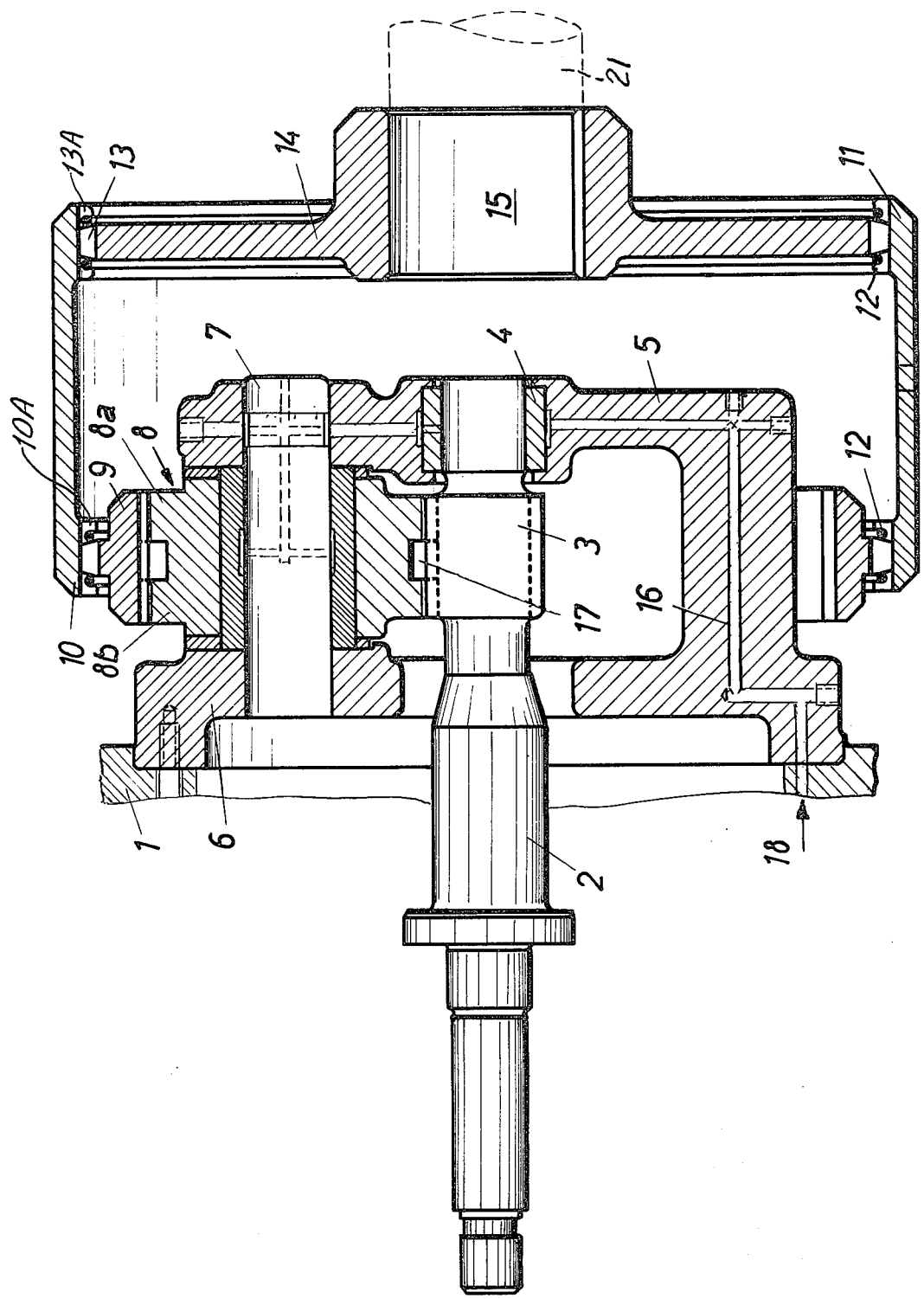

GEAR DRIVE

FIELD OF THE INVENTION

The invention relates to a gear drive arrangement having at least two meshing spur gears. The invention does not relate to gears having herringbone teeth.

BACKGROUND OF THE INVENTION

During rolling of spur gears in gearing arrangements, which are lubricated by a lubricant having a high viscosity, or in gearings with oils having a lower viscosity or high rotational speed, high power losses may occur caused by the squeezing of oil out from between the teeth, in particular when the mating spur gears are so wide that most of the oil must exit in direction of the tooth height and only a small part can escape at the axially facing sides of the gear.

Spur gear systems having herringbone teeth are already known and which have in the center of the tooth width a peripheral groove so that the gear cutting tool has sufficient space to work the teeth. In these spur gears, the oil does not only escape toward the outer axially facing ends, but also toward the peripheral grooves. The power loss is thereby less. These peripheral grooves have so far only been used in herringbone spur gears for technical manufacturing reasons, while the reduction of the power loss has been up to now a side effect which has been virtually unconsidered. Herringbone gears are relatively expensive and the peripheral grooves effect possibly an undesired interrupted cut of the gear tool.

Therefore the basic purpose of the invention is to find a structure which will reduce the power loss through trapped oil, in which exists a cheaper type of toothing, and in which the interrupted cut is avoided as much as possible.

SUMMARY OF THE INVENTION

In general, the objects and purposes of the invention are met by providing a gear drive arrangement having at least two meshing spur gears which are helical or straight toothed in only one pitch direction. One of the meshing spur gears consists of at least two axially spaced gear parts thereon having, approximately in the center of the entire gear width, at least one peripheral groove which is at least as deep as the tooth height, while the other meshing spur gear is free of a peripheral groove.

BRIEF DESCRIPTION OF THE DRAWING

The invention will be discussed in connection with a schematically illustrated exemplary embodiment.

DETAILED DESCRIPTION

The drawing illustrates a plurality of spur gears of a planetary gear arrangement. Each of the gears are supported in a conventional manner in an indicated, but not fully illustrated housing 1. The support bearings for the spur gears are lubricated by a lubricating means, the viscosity of which is selected in relationship to the number of rotations of the gears. The output shaft 2 of the gearing is connected to drive a not illustrated rotary compressor. A pinion or sun gear 3 is mounted on an end of the output shaft 2. The end of the output shaft 2 adjacent the pinion 3 is received in a bearing 4 mounted in a bracket 5 secured through a flange 6 to a wall on the housing 1. Three intermediate gears 8 are, for example, rotatably supported on the bracket 5 by means of bolts 7. The intermediate gears 8 mesh with an internally and externally toothed ring gear 9, which ring gear 9 is supported by the external coupling teeth 10 thereon in an angularly movable and internally toothed coupling sleeve 11. Snap rings 12 or the like are provided for axial locking of the teeth 10 into coupling engagement with the internal teeth 10A on the coupling sleeve 11. A second set of coupling teeth 13A are provided at the other end of the coupling sleeve 11, which teeth are engaged by counter teeth 13 on a radially extending coupling flange 14. The teeth 13 on the flange 14 are secured against an axial movement relative to the coupling sleeve 11 by snap rings 12 or the like. The flange 14 has a central hub thereon having a hole 15 therethrough. A drive shaft 21 is received in the hole 15 and is coupled to a not illustrated driving engine.

Lubricant is supplied from a not illustrated oil pump (arrow 18) through the lubricating channels 16 in the bracket 5 and is distributed in a suitable manner. If the lubricant has a high viscosity, which may be due to the fact that it is mixed with a heavy gas, and/or at a high number of rotations of the spur gears, the high viscosity results a high power loss, because the lubricant must be squeezed out of the meshing teeth substantially in a direction toward the depth of the tooth. To reduce this loss, the intermediate gears 8 have, approximately in the center of their tooth width, a peripheral or annular groove 17 which has a depth which is below or radially inwardly of the root or dedendum circle of the teeth. Thus two axially spaced gear parts 8a,8b are formed which makes it possible for the trapped oil to exit from between the teeth into the groove 17 and also at the axially facing sides of the teeth. The peripheral groove 17 functions to reduce the power loss when the entire gear width exceeds the amount of 10 times the module of the gear.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A gear drive arrangement, comprising:
   a first spur gear having a plurality of straight and parallel teeth thereon and first support means supporting said first spur gear for rotation about a first axis of rotation;
   a second spur gear equal in width to said first spur gear and having a plurality of straight and parallel teeth thereon and second support means supporting said second spur gear for rotation about a second axis of rotation, said teeth on said second spur gear meshing with said teeth on said first spur gear only over a small zone of said diameters of said first and second spur gears so that a majority of teeth on said first and second spur gears are free of engagement with each other;
   lubricant means for lubricating said first and second spur gears; and
   annular groove means around the periphery of said second spur gear and in the center of the width thereof for receiving the axial flow of lubricant between the teeth in at least said zone of meshing engagement between said first and second spur gears to thereby minimize the power loss due to the presence of said lubricant, said groove being at least as deep as the tooth height, said teeth of said first spur gear being free of a peripheral groove.

2. The improved gear drive according to claim 1, wherein one of first and second spur gears is an internally toothed internal gear, and wherein the internal teeth are free of a peripheral groove therebetween.

3. The improved gear drive according to claim 1, wherein at least one of the gears has a meshing tooth width of at least 10 times the module of the gear.

4. The improved gear drive according to claim 1, wherein said second spur gear is free of lubricant passageways therein communicating with the periphery thereof.

* * * * *